UNITED STATES PATENT OFFICE.

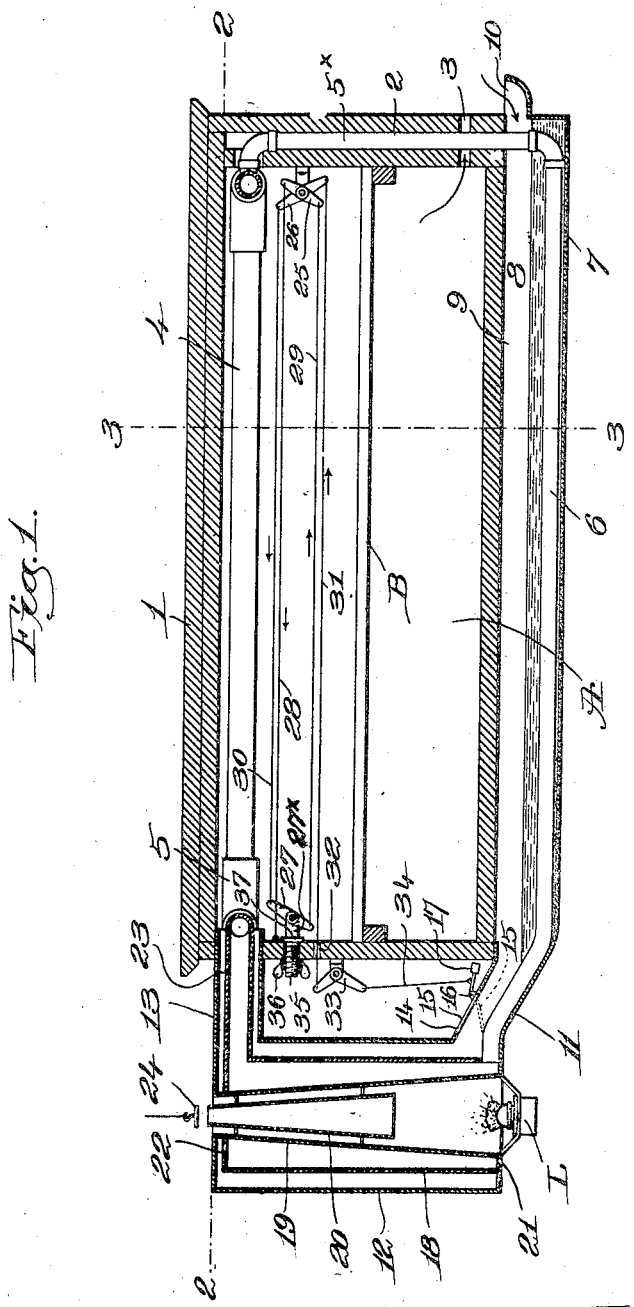

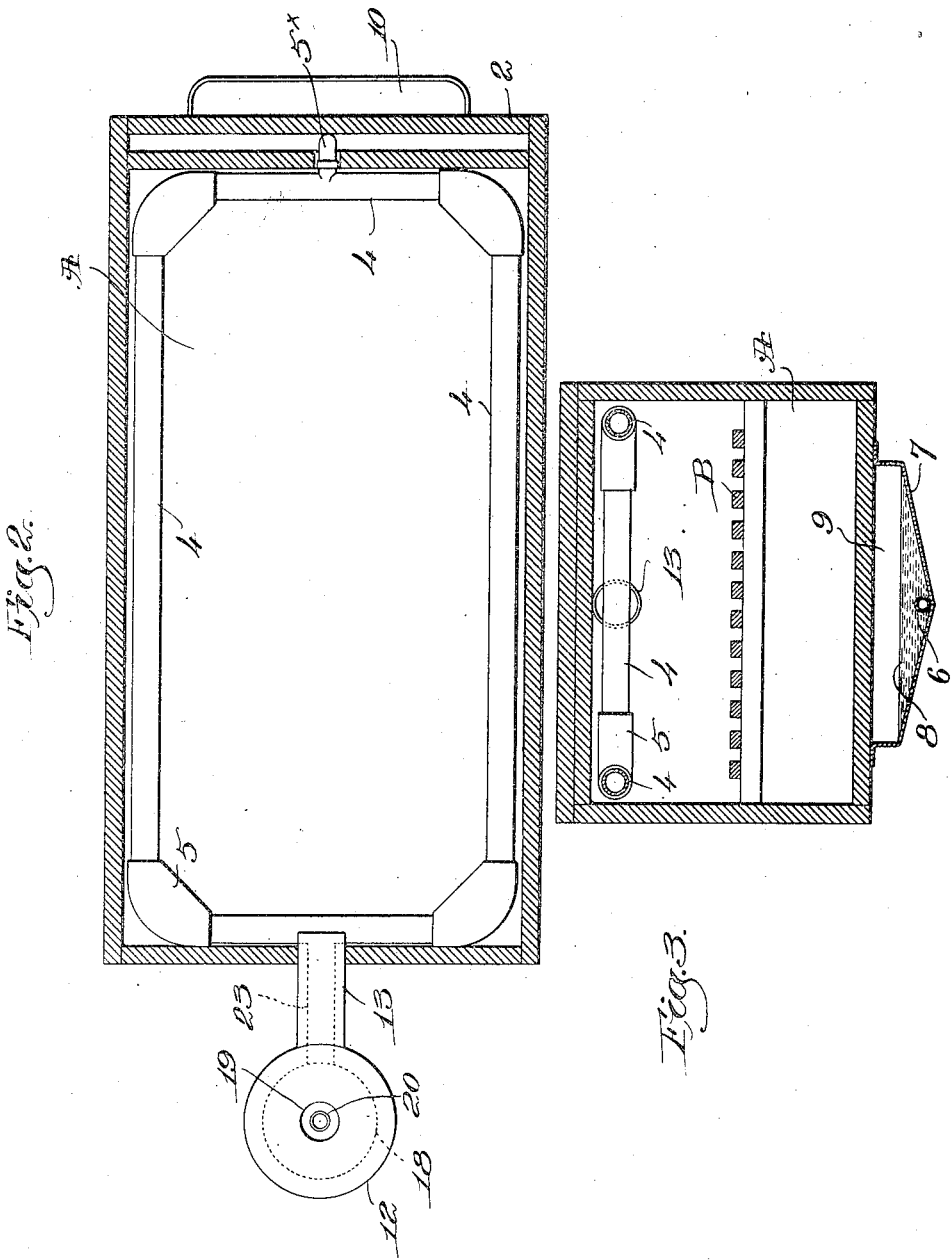

WILBUR E. MAYNARD, OF NORTHAMPTON, MASSACHUSETTS.

INCUBATING APPARATUS.

981,097. Specification of Letters Patent. Patented Jan. 10, 1911.

Application filed October 1, 1909. Serial No. 520,529.

*To all whom it may concern:*

Be it known that I, WILBUR E. MAYNARD, a citizen of the United States, and resident of Northampton, county of Hampshire, State of Massachusetts, have invented an Improvement in Incubating Apparatus, of which the following description, in connection with the accompanying drawing, is a specification, like characters on the drawing representing like parts.

This invention has for its object the production of an improved incubating apparatus, whereby the operation is increased in efficiency and a more perfect control is secured.

In the proper operation of incubating apparatus the temperature of the incubating chamber must be kept at a relatively high point, and at the same time a current of fresh air should be maintained in circulation through said chamber, to properly ventilate it and provide also the requisite amount of oxygen. At present it is common to supply the incubating chamber with heated air, but so far as I am aware it has been a dry air, many persons using such apparatus maintaining that moisture is detrimental to the incubation process. In such apparatus the temperature of the air supplied to the chamber is high in order that the egg chamber or compartment may be heated, and this air is depended upon to supply with oxygen the embryo chick during incubation, but if this hot air were permitted to circulate freely about the eggs and pass out of the chamber the eggs would be so dried that the chicks would die in the shell. While there may be sufficient moisture in the egg, if retained, to bring the chick to the hatching point, the growing embryo suffers from lack of oxygen because of the almost imperceptible air circulation, and as a result the chicken develops anemia. Hot water incubators do not supply sufficient ventilation, partly for reasons above stated and partly because when ventilation is attempted no means are provided to properly warm the incoming air, resulting in a cold draft at the inlet of the chamber and overheating at the outlet.

It has been proposed to create a moist atmosphere in the egg chamber by placing trays of water or wet sand in the bottom of the chamber, but this arrangement possesses little value, for if the ventilation is at or near the bottom of the chamber, where it should be, the moist air is immediately forced out through the ventilators instead of passing up and around the eggs. To retard the ventilation in order to saturate the atmosphere of the egg chamber would be fatal to the growing chick, and the humidity cannot be regulated.

In artificial incubation it is necessary to so control the evaporation that the eggs lose about 13% of the original weight, which is about the loss which takes place under the hen in natural incubation, and this result would be attained if in the incubating chamber the same high degree of humidity be maintained as exists under the hen in natural incubation.

As the result of many experiments in the line of artificial incubation I am convinced that an abundance of fresh air in the incubating chamber is absolutely necessary for the proper growth of the healthy chicken, as a plentiful supply of oxygen for the nourishment of the growing tissues of the chick is of vital importance. I have found that most satisfactory results are secured by supplying the incubating chamber with fresh moist and heated air, preferably moistened prior to its entrance to the chamber, and maintaining a constant but gentle circulation of the air, thereby providing an ample supply of oxygen while effectively ventilating the chamber. This moistening I effect by drawing the fresh cool air from the atmosphere over a body of heated water, so that the moisture given off by evaporation of the water is taken up by the air, the latter being thereafter heated prior to its introduction to the incubating chamber.

As the humidity of the air in the chamber should not become too great I have provided a hygroscopically-governed controlling device which determines automatically the relative proportions of fresh air, both moist and dry, admitted to the air-heating device, and by the term "dry air" I mean air taken directly from the outside of the apparatus and not subjected to any artificial moistening. The moist, heated air is supplied to the chamber at one end thereof, near the top, in my present invention, and passes from the chamber through an outlet which is always open, the air as it cools in the chamber descending and passing through the outlet, which is near the bottom of the chamber at a distance from the hot air inlet, maintaining the circulation and ventilation.

I heat the chamber independently of the air supplied thereto, and as herein shown by a hot-water circulation system which herein comprises a radiator within and at the top of the incubating chamber, an external hot-water heater connected with such radiator, and a return pipe or conduit, which latter is arranged to heat the water in the evaporating tank or chamber.

The various novel features of my invention will be fully described in the subjoined specification and particularly pointed out in the following claims.

Figure 1 is a longitudinal sectional view of an incubating apparatus embodying one form of my present invention; Fig. 2 is a part plan and horizontal sectional view thereof, on the line 2—2, Fig. 1; Fig. 3 is a transverse section on the line 3—3, Fig. 1.

In the drawings A is the incubating chamber shown as rectangular in shape, and of any suitable construction, one of its end walls 2 having an air outlet 3 near the bottom, the incubating chamber having therein a suitable egg tray or shelf B. Near the top 1 of the chamber I mount a radiator comprising connecting pipes 4 and corner pieces 5, best shown in Fig. 2, the corner pieces being conveniently made as castings, and given enlarged heating surfaces at the corners to better provide for the thorough diffusion of the heat.

In my present invention, the heating of the incubating chamber is effected by a hot water circulation system which comprises the radiator referred to, a hot water heating device to be described, and having its outlet connected with the radiator at one end and a return pipe or conduit $5^x$, 6 connecting the opposite end of the radiator and the inlet of the heater. The part $5^x$ of the return pipe is extended through the end wall 2 of the chamber at substantially the center thereof, and passes down below the bottom of said chamber, the horizontal portion 6 of the return pipe traversing the bottom of an evaporating tank 7, suitably secured to the bottom of the incubating chamber and extending from one to the other end thereof, as herein shown.

The evaporating tank or chamber 7 is shaped in cross-section, as shown in Fig. 3, and in practice will be kept filled with a body of water 8, leaving an air space or passage 9 between the surface of the water and the bottom of the chamber, and as shown in Figs. 1 and 2, an inlet 10 is provided leading to the evaporating tank and serving not only as a filling opening, but also to admit a constant supply of fresh air to the space or passage 9. At its opposite end the chamber or tank 7 is reduced to form a conduit 11, which opens into or communicates with the lower part of the air heating device, shown as a cylindrical metallic chamber 12 closed at its top and bottom, and having at its upper end a tubular outlet 13 which extends into the adjacent wall of the incubating chamber A near the top thereof. The conduit 11 is provided with an opening 14, Fig. 1, leading to the external air, the air heating chamber 12 being located some little distance beyond the nearer end of the incubating chamber, as shown. This inlet 14 is controlled by a valve 15 pivoted at 16, and having an attached weighted arm 17 which normally tends to position the valve as shown in full lines, Fig. 1, to close the opening 14. The valve may be moved, however, into dotted line position, Fig. 1, to open the dry air inlet 14, and to substantially close the conduit 11 through which conduit the hot water return pipe 6 passes to and communicates with the bottom of the hot water heater. This hot water heater is within and concentric to the air heating chamber 12, and in the present embodiment of my invention, the hot water heater comprises an outer cylindrical metallic wall 18, a conical inner wall 19 having therein a concentric open-ended tube 20. The walls 19 and 20 form a species of chimney for the products of combustion given off by the lamp L, of any suitable character, inserted at the bottom of the heater. The water chamber inclosed within the walls 18 and 19, the bottom plate 21, and the top plate 22, is connected at its upper end by a pipe 23 with the radiator, said pipe 23 passing through the hot-air inlet 13, as clearly shown.

The hot water circulation system being properly filled with water, the lamp L is lighted, and as the water in the chamber around the chimney of the hot water heater becomes heated, the circulation of the water is set up, the hot water passing through the inlet 23 to the radiator, and from the radiator it passes down the pipe $5^x$ and along the pipe 6 back to the water heater. The hot water traversing the pipe 6 heats the body of water 8 in the evaporating tank or chamber, and the moisture given off is taken up by the fresh air which is constantly entering at the inlet 10. the air as it traverses the chamber or passage 9 taking up the moisture given off by the water, and if the valve 15 is in the full line position shown in Fig. 1, the moisture-laden air will pass into the lower part of the air heater or chamber 12, and will be heated as it passes up around the outside wall 18 of the hot water heater. That is, heated and moist air then passes through the air inlet 13 into the incubating chamber A at one end and near its top. By the construction set forth the incubating chamber is thus heated by the hot water circulation system, and it is also supplied with moist, warm air. The air in the upper part of the incubating chamber is thus the warmest, and as the air cools, it descends in the chamber and flows out through the opening 3, and preferably said opening is never closed. This provides for a continuous passage of the warm and moisture-laden air through the incubating chamber so that at all times the latter is supplied with fresh air, that is, air from the outside. This obviates any objections arising from dead air and greatly adds to the efficiency of the apparatus. The action of the hot water heater is regulated by the conical walls 19, 20, the top of the latter having a closure 24 which may be raised and lowered by a thermostatic regulator as is usual in incubators.

When the closure 24 is raised the heat from the lamp passes more directly through the inner cone 20 and less heat is transmitted to the water in the surrounding water chamber, but when the closure 24 is lowered, thus closing the top of the cone 20, the heat from the lamp must pass between the walls 19 and 20 and thereby closer to the water which is thus subjected to a greater heating action.

It is necessary to prevent the air in the incubating chamber A from becoming too moist, and I have provided a hygroscopically governed controlling device to automatically operate the valve 15 so that when the air in the chamber A becomes too moist the valve will be moved more or less toward dotted line position, Fig. 1, to thus cut off the admission of moisture-laden air to the air heating chamber 12, while admitting dry air thereto through the inlet 14. The relative proportion of dry and moisture-laden air is thus determined by the position of the valve 15. If the valve is in its full line position, Fig. 1, all of the air admitted to the chamber 12 will be moist, whereas if the valve is partly open, some moist air and some dry air will pass in the said chamber 12.

The controlling device, as herein shown, comprises two levers 25, 26, pivotally mounted within the incubating chamber near its end wall 2, and a lever 27 pivoted on the opposite end wall. A cotton cord 28 fixed at one end is attached at its other end to one arm of the lever 25, the other arm of said lever being connected by a cotton cord 29 with the lower arm of the lever 27. The upper arm of said lever is connected by a cotton cord 30 with the upper arm of the lever 26, and the lower arm of said lever has attached to it a cord or wire 31, extended through a small opening 32 in the wall of the chamber, and attached to a bell crank 33, in turn connected by a cord or wire 34, with the weighted valve arm 17.

When the air within the chamber A becomes too moist, the several cords 28, 29 and 30 contract, and as they contract, they tend to draw in the direction shown by small arrows, Fig. 1, swinging the levers 25, 26 and 27, and acting through the connection 31 to rock the bell crank 33 and exert a pull on the connection 34, which lifts the arm 17 and depresses the valve 15 to a greater or less extent, according to the amount of contraction of the cords. When the humidity of the air in the chamber A decreases, then the cords of the hygroscopic controlling device lengthen, and the several levers are moved in the reversed direction, so that the bell crank 33 slackens the connection 34, and the weighted arm 17 lifts the valve more or less according to circumstances. Thus a very perfect and automatic control is secured, the heated air supplied to the incubating chamber being more or less moist as the humidity of the air within the incubating chamber increases or decreases, respectively.

In order to adjust the controlling device conveniently the bracket 27× on which lever 27 is mounted has a threaded shank 35, Fig. 1, passed loosely through a hole in the end wall of the chamber, and a thumb-nut 36 screwed onto the shank acts to draw the latter out more or less, to thereby change the distance between levers 25, 26 and the lever 27. Rotative movement of the bracket is prevented by a stop-block 37 secured to the inner face of the chamber wall alongside the bracket 27×.

My invention is not restricted to the precise construction and arrangement herein shown and described, as various changes or modifications may be made in details of construction and arrangement by those skilled in the art without departing from the spirit and scope of my invention as set forth in the claims annexed hereto.

Having fully described my invention, what I claim as new and desire to secure by Letters Patent is:—

1. The combination, with an incubating chamber, an external heater, a closed circulation system connected therewith and traversing said chamber, of an air chamber heated by said heater and communicating with the incubating chamber near its top, said air chamber having an inlet for external air, a water chamber outside the incubating chamber and having a fresh air inlet and communicating with said air chamber, the return pipe of the circulation system traversing the water chamber to heat the water therein, the moist air passing from the water chamber to the air chamber to be heated, and means including a valve controlling the external air inlet and also the supply of moist air passing from the water chamber to the air chamber, to vary automatically the quantity of moisture in the heated air supplied to the incubating chamber.

2. The combination with an incubating chamber having an inlet at one end, near its top, and an outlet at a distance therefrom near its bottom, of an air chamber connected with the inlet, a heater surrounded by said air chamber and connected with a closed system for the circulation of a heating medium and traversing the incubating chamber, a water-evaporating chamber having an open inlet for fresh air and heated by said circulation system, a connection between said evaporating and air chambers, having an inlet for external air, and means controlled by the humidity of the air in the incubating chamber to control said connection and the external air inlet thereof and thereby supply the air chamber with moist air from said evaporating chamber and dry, external air, in varying proportions.

3. The combination with an incubating chamber having an inlet at one end, near its top, and an outlet at its opposite end, near its bottom, of an air chamber connected with the inlet, a hot-water heater surrounded by said air chamber and connected with a circulation system, including a radiator within and near the top of the incubating chamber, a water-evaporating chamber having an open inlet for fresh air and heated by said circulation system, a conduit leading from the evaporating chamber to the air chamber and having an inlet for external air, a valve to open the conduit and close the inlet, and vice versa, to vary the proportions of moistened and external air admitted to the air chamber, and valve-operating means governed by the humidity of the air in the incubating chamber.

4. The combination with an incubating chamber having an inlet near its top, and an outlet at a distance therefrom near its bottom, of an air chamber connected with the inlet, a water-evaporating chamber below the incubating chamber and having a fresh air inlet, heating means coöperating with the air chamber to heat the air passing therefrom to the incubating chamber and also serving to evaporate the water in the evaporating chamber, a conduit leading from the air space of the latter to the air chamber, said conduit having an inlet for dry air, and automatic means governing the conduit and its inlet to vary the proportions of dry and moistened air passing from the conduit to said air chamber according to the humidity of the air in the incubating chamber.

5. The combination, with an incubating chamber, and heating means for the interior thereof, of an inclosed water chamber below the incubating chamber and having an open inlet for the admission of fresh air, means to effect evaporation of the water and thereby to moisten the air passing through said water chamber, means to heat such moistened air and supply it to the incubating chamber near the top thereof, a conduit connecting said means and the water chamber, said conduit having an inlet for dry air, and a device governed by the moisture of the air in the incubating chamber to control the conduit and its dry air inlet and thereby vary the moisture in the heated air supplied to said incubating chamber.

In testimony whereof, I have signed my name to this specification, in the presence of two subscribing witnesses.

WILBUR E. MAYNARD.

Witnesses:
BESSIE G. MORRIS,
THOMAS J. DRUMMOND.